Nov. 15, 1960
O. B. SHERMAN
2,960,425
METHOD OF INTEGRALLY UNITING THERMOPLASTIC SHEETS
WITH EXTRUDED PLASTIC MATERIAL
Filed Sept. 2, 1955
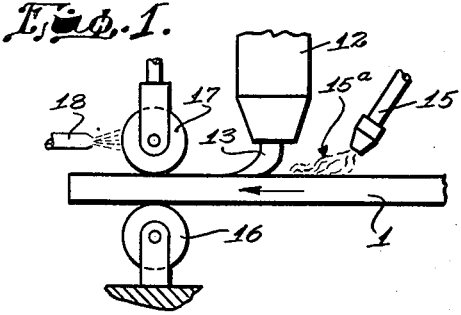
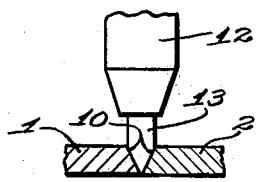
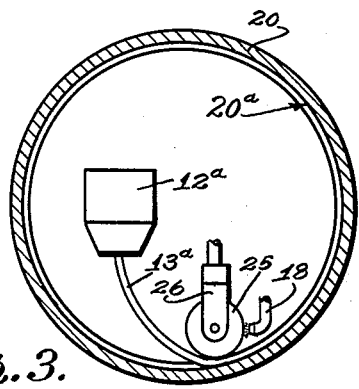
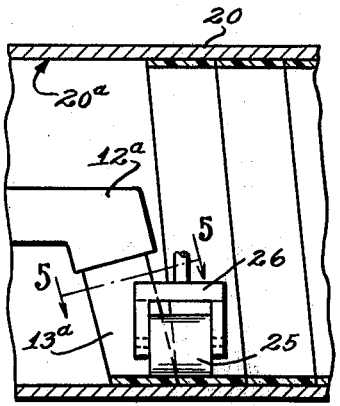
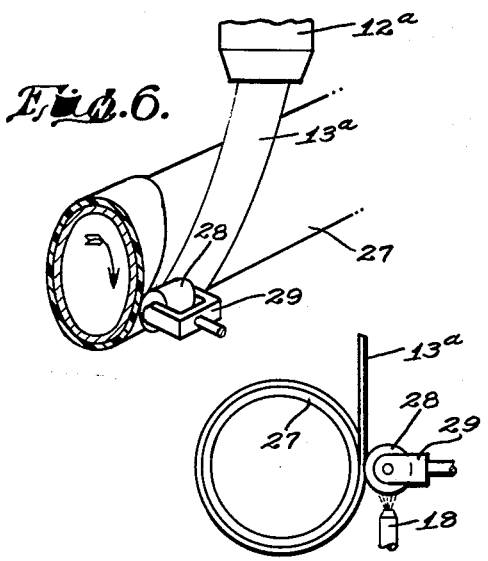
INVENTOR.
O. B. SHERMAN
BY
Rule and Hoge
ATTORNEYS United States Patent Office 2,960,425
Patented Nov. 15, 1960

2,960,425

METHOD OF INTEGRALLY UNITING THERMO-PLASTIC SHEETS WITH EXTRUDED PLASTIC MATERIAL

Orville B. Sherman, Toledo, Ohio, assignor to Owens-Illinois Glass Company, a corporation of Ohio Filed Sept. 2, 1955, Ser. No. 532,165

2 Claims. (Cl. 154—116)

My invention relates to the fabrication of various objects from plastic materials, including methods of integrally uniting strips or sheets of plastic material when their edges are brought together, means and methods for extruding plastic material in sheet or strip form and fabricating the material while still in a plastic condition for forming various objects, applying interior linings to hollow or tubular articles, and covering the external surfaces of cylinders or other objects with plastic material in sheet form.

The invention provides a method and means for integrally uniting the sheets or strips of plastic material by beveling their edges, bringing the beveled edges together to form a trough or V groove, extruding plastic material to fill such groove and integrally unite the parts. The invention further provides a method and means of extruding plastic material in strip form, spirally winding the strip to form a cylindrical body and integrally uniting the edges of the strip while still soft and plastic. In accordance with the present invention liners of the plastic material may be applied to the interior surface of hollow articles, tubes, and the like. The invention further provides for covering the exterior surfaces of pipes or other objects with the plastic strip material and bonding the strip edges to form a seamless covering.

Other features of the invention and the precise nature thereof will appear more fully hereinafter.

Referring to the accompanying drawings:

Fig. 1 is an elevational view, partly diagrammatic, illustrating a method of uniting the edges of strips or sheets of plastic material;

Fig. 2 is a cross-sectional view of the same;

Fig. 3 is a diagrammatic view illustrating a method and apparatus for applying plastic sheet material as an interior lining to a hollow cylindrical article;

Fig. 4 is a sectional view of the parts shown in Fig. 3;

Fig. 5 is a cross section of a strip of a plastic material, the section taken at the line 5—5 on Fig. 4;

Fig. 6 is a sectional perspective view of the apparatus for applying a strip of plastic material as a covering for a cylindrical object; and Fig. 7 is an end elevation of the apparatus shown in Fig. 6.

Referring to Figs. 1 and 2, I have illustrated a method and means for integrally uniting strips or sheets 1 and 2 of thermoplastic material which may be softened by heating. The edges 10 of the strips 1 and 2 are beveled to provide a V-shaped space or trough when the edges are brought into contact. An extruder 12 positioned over the strips 1 and 2 continuously extrudes a welding strip 13 of plastic material while a relative movement of the extruder and the workpieces 1 and 2 is maintained in a direction lengthwise of the seam or edges 10. In this manner the extruded plastic 13 in a soft, plastic condition is deposited in and fills the V-shaped groove, thus integrally uniting the parts 1 and 2. The relative movement of the extruder and workpieces is effected either by moving the extruder along the seam or by advancing the parts 1 and 2 in the direction in which the seam extends.

The extruded material may be a thermoplastic which is at an elevated temperature and in a semi-fluid or soft, plastic, movable condition when extruded and which hardens when cooled. The strips 1 and 2 are preferably locally heated to soften the material along the meeting edges in advance of the deposit of plastic material 13. Such heating is effected by a heating element 15 which comprises a nozzle through which hot air, or gas is directed along the seam. The heater 15 may be a gas torch supplying a heating flame 15ª. This heating is applied just in advance of the plastic 13.

The sheets 1 and 2 may be drawn lengthwise beneath the extruder and heater by a pair of rolls 16 and 17 positioned respectively beneath and above the sheets. These rolls may be driven to advance the work or the latter may be drawn forward (by means not shown) while the rolls 16 and 17 function as pressure rolls to firmly imbed the plastic material 13 in the groove and also smooth out the surface along said seam. A nozzle 18 directs a blast of cooling air or other fluid against the roller 17 so that the joint is rapidly cooled and set by extraction of heat by the cooled roller. Localized cooling may also be effected by applying the cooling air directly to the extruded plastic in the groove. The strips 1 and 2 may consist of the same material as the extruded welding strip 13 so that the parts are welded together to form a homogeneous body, the heating means 15 serving to facilitate such welding operation.

Figs. 3 and 4 illustrate the invention as used for applying a lining of strip material to the interior cylindrical surface of a workpiece 20 which may be a container, pipe, tube or other object. In this form of the invention the extruder 12ª is formed with an elongated discharge nozzle shaped to extrude the material in the form of a ribbon or welding strip 13ª. This strip is wound spirally on the interior surface 20ª of the article 20. Such spiral winding may be effected either by rotating the extruder about the axis of the article 20 or rotating the latter about its longitudinal axis. The extruded welding strip 13ª is drawn outwardly at an angle such that the edges of the strip meet to form a spiral seam. As shown in section, Fig. 5, these edges 13ᵇ are parallel and inclined at acute angles to the upper and lower surfaces of the strip, the inclination being such that the edges fit together.

A roller 25 mounted in a yoke 26 is positioned within the cylinder 20 and moved in a spiral path as the material is extruded. The roller is positioned to overlie the seam substantially at the point at which the latter is being formed and is maintained in such position during the application of the strip. The roller serves to apply the plastic strip evenly to the surface 20ª and also applies sufficient pressure to weld the edges of the strip together as the seam is formed, thus forming an integral lining for the workpiece 20.

Figs. 6 and 7 illustrate an apparatus for use in applying a welding strip of the plastic material to the exterior surface of a pipe or other object. The extruder 12ª and strip 13ª may be substantially the same as disclosed in Figs. 3 and 4. The strip is wound spirally on the exterior surface of the article 27. The seam is formed and the edges welded together by a pressure roll 28 mounted in a yoke 29 and traveling along the seam as it is formed. This roll integrally unites the edges, operating in the same manner as above described in connection with the roller 25.

The extrusion head 12 (or 12ª) may be operated in the manner disclosed in the copending application of Sherman et al., Serial Number 450,604, filed August 18, 1954, Method and Apparatus for Making Plastic Articles, now Patent No. 2,858,564. The plastic material may be supplied at a uniform temperature and pressure, either continuously or intermittently, by the means and method disclosed in the copending application of Sherman et al., Serial Number 441,394, filed July 6, 1954, Method and Apparatus for Fitting Plasticized Materials, now Patent No. 2,871,516.

Modifications may be resorted to within the spirit and scope of my invention as defined in the claims.

I claim:

1. The method which comprises bevelling the edge surfaces of pieces of thermoplastic material in sheet form, bringing the bevelled edges together and thereby forming a groove between the edge surfaces of said pieces, directing a heating medium against said pieces at a localized area along said groove, advancing the heating medium along the groove and thereby progressively softening the material along the groove, extruding into the open air and directly into said groove plastic material from an extruder in the form of a strip and depositing the strip progressively along said groove as said heating medium advances and pressing the strip into the groove by pressure transmitted from the extruder to the issuing material and applied progressively along the seam during the deposit of said material and thereby welding the extruded plastic to said pieces.

2. The method which comprises beveling the edges of two parts of sheet material, bringing said edges together with the edge surfaces forming a groove, extruding into the open air and directly into said groove a welding strip of plastic material from an extruder outlet adjacent the groove with the issuing material in the form of a strip commensurate in cross sectional area and shape with the cross sectional area and shape of the groove and with the strip directed in a curved path from the extruder outlet into the groove, and effecting a relative movement of the extruder and the said sheet material in a direction lengthwise of the groove during the extrusion of the material and while the material issuing from the extruder remains integral with that in the groove and with the curved path advancing along the groove during said relative movement, the speed of said relative movement and the rate of extrusion being such that the welding strip substantially fills the groove as it is deposited therein, and contacting the welding strip and the adjacent edges of the sheet material with a cooled compression implement.

References Cited in the file of this patent

UNITED STATES PATENTS

| | | |
|---|---|---|
| 1,846,325 | Fischer | Feb. 23, 1932 |
| 1,952,038 | Fischer | Mar. 20, 1934 |
| 2,089,014 | Bucknam et al. | Aug. 3, 1937 |
| 2,091,124 | Stewart | Aug. 24, 1937 |
| 2,293,252 | Foster et al. | Aug. 18, 1942 |
| 2,313,750 | Hothersall | Mar. 16, 1943 |
| 2,343,775 | Land | Mar. 7, 1944 |
| 2,438,685 | Stevens | Mar. 30, 1948 |
| 2,516,864 | Gilmore et al. | Aug. 1, 1950 |
| 2,520,337 | Roberts et al. | Aug. 29, 1950 |
| 2,582,022 | Feldman et al. | Jan. 8, 1952 |
| 2,596,513 | Tocci-Guilbert | May 13, 1952 |
| 2,602,187 | Samler | July 8, 1952 |
| 2,700,631 | Ferguson et al. | Jan. 25, 1955 |
| 2,703,299 | Seymour et al. | Mar. 1, 1955 |
| 2,751,321 | Sans | June 19, 1956 |

FOREIGN PATENTS

| | | |
|---|---|---|
| 634,465 | Great Britain | Mar. 22, 1950 |